Dec. 28, 1943.          L. PETERSEN          2,338,057
STATIC BALANCING MACHINE
Filed Nov. 22, 1940          2 Sheets-Sheet 1
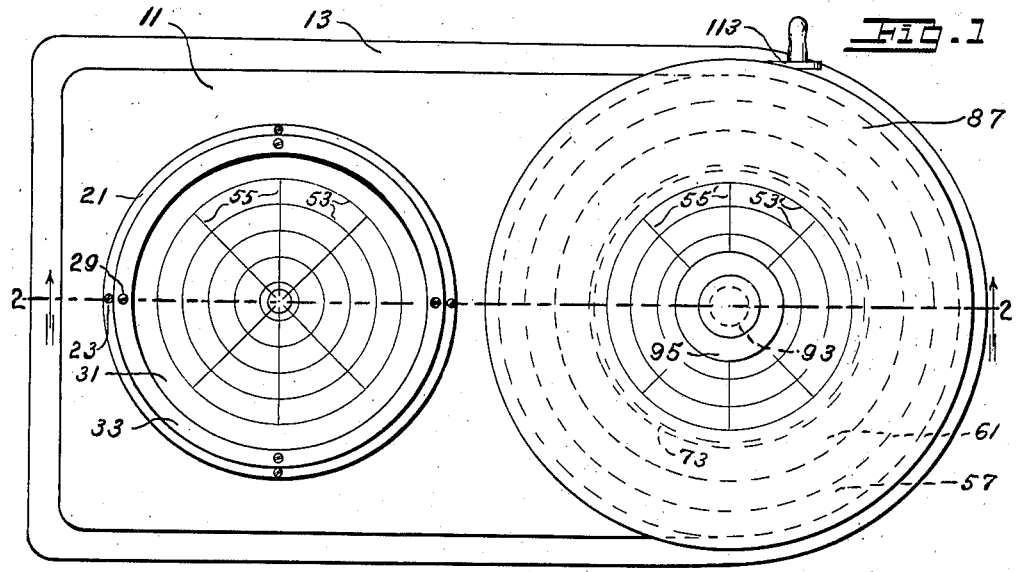
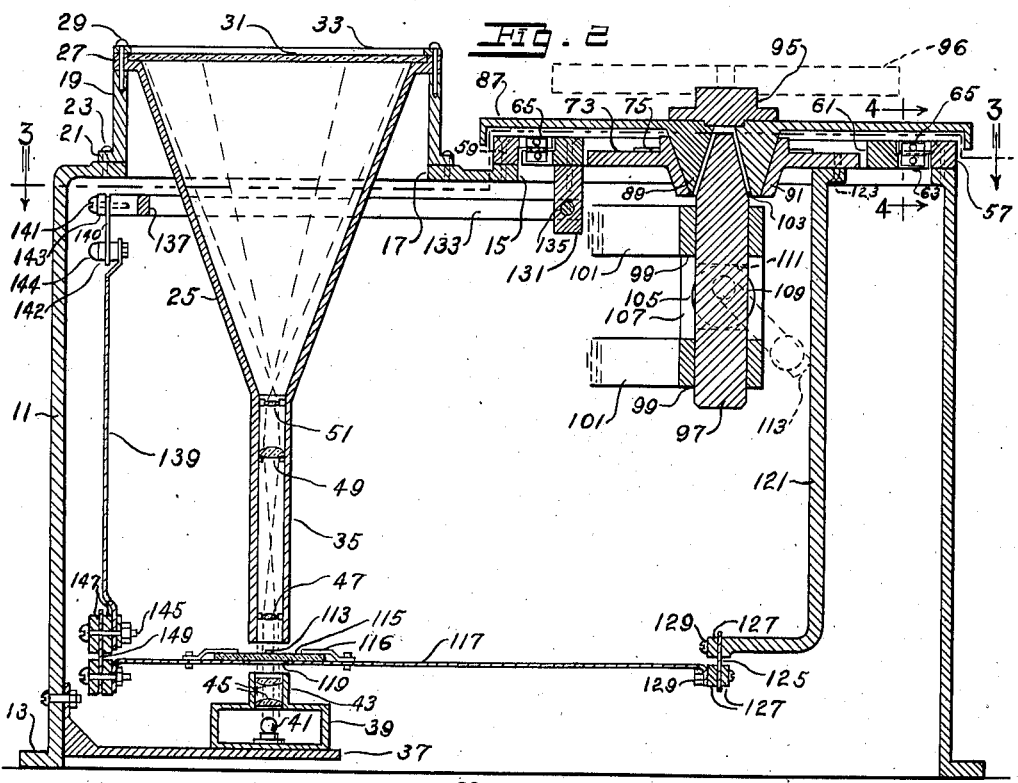
INVENTOR.
Louis Petersen
BY
HIS ATTORNEY

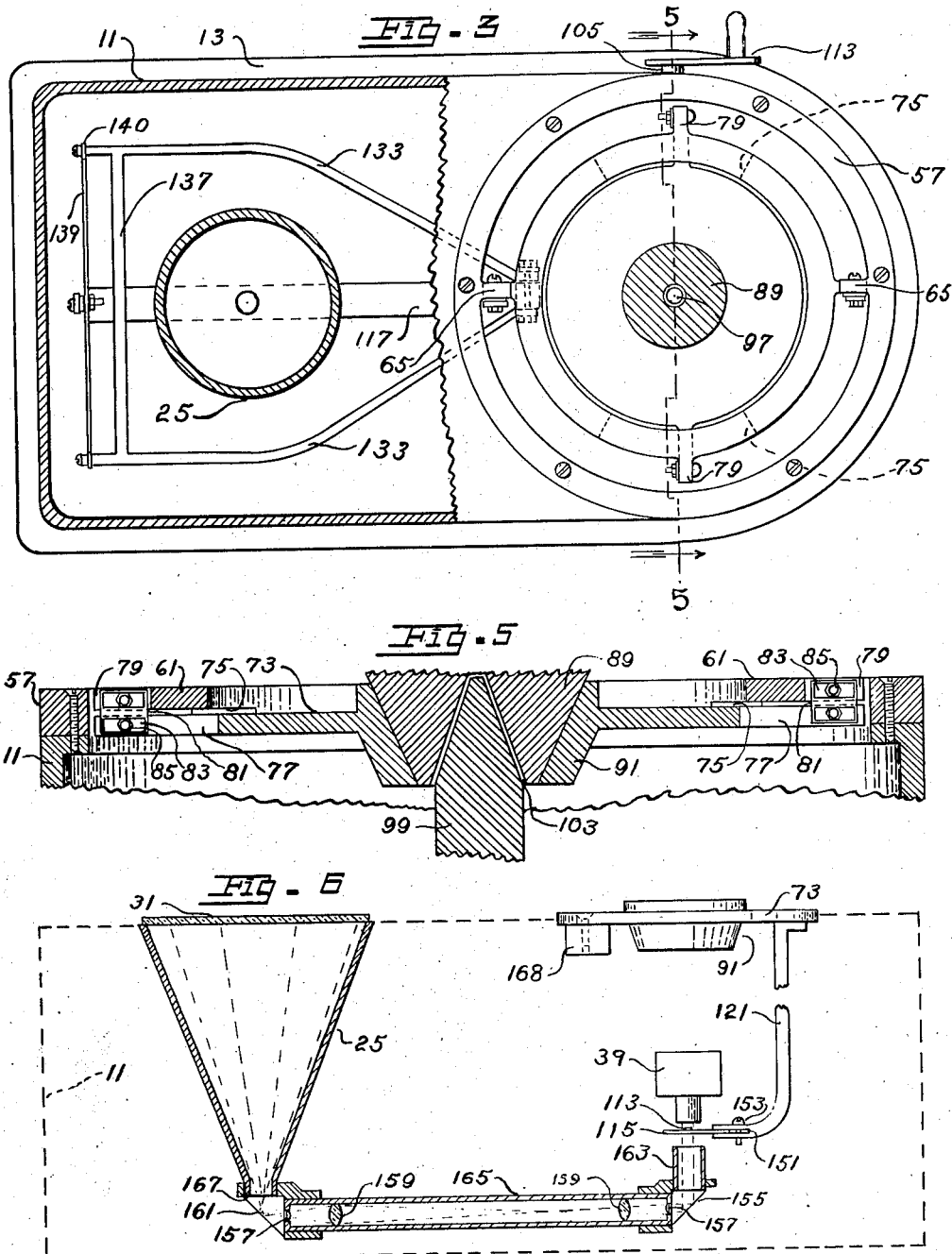

Patented Dec. 28, 1943

2,338,057

UNITED STATES PATENT OFFICE 2,338,057

STATIC BALANCING MACHINE

Louis Petersen, Detroit, Mich., assignor to Joseph P. Lannen

Application November 22, 1940, Serial No. 366,599

9 Claims. (Cl. 73—53).

My invention pertains to mass centering apparatus and more particularly to work balancing machines for measuring and indicating the amount and location of the unbalance in a piece of work or material which has been placed on the machine for testing.

It is an object of my invention to provide a mass centering machine of a simple rugged construction, which is convenient and economical to manufacture, maintain and use, and which provides accurate indications of the amount and location of the unbalanced mass of a piece of work centered thereon.

It is also an object of my invention to provide such a work balancing machine having an improved simplified universal mounting structure for the work supporting member.

It is a further object of my invention to provide in such balancing machines an improved system for producing conveniently observable manifestations for showing the amount and the location of the unbalanced mass in a piece of work centered on the machine for testing.

Another object of my invention is to produce such a testing machine of an improved simplified rugged construction eliminating relatively moving and frictionally engaging parts, pivots and the like which tend to introduce varying friction conditions, wear and misadjustment in the apparatus.

A further object of my invention is to provide a light beam indicating system cooperatively disposed in such a mass balancing system to provide conveniently observable magnified indications of the amount and location of the unbalanced mass of the piece of work being tested.

Further objects and advantages are within the scope of my invention, such as relate to the arrangement, operation and function of the related elements of the structure, to various details of construction, and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Fig. 1 is a plan view of my improved balancing machine;

Fig. 2 is a sectional view taken on line 2—2 of Fig. 1;

Fig. 3 is a sectional view taken on line 3—3 of Fig. 2;

Fig. 4 is an enlarged detail view taken on line 4—4 of Fig. 2;

Fig. 5 is an enlarged detail sectional view taken through the work support member and the universal mounting thereof as indicated by line 5—5 in Fig. 3; and Fig. 6 is a diagrammatic view showing another simplified embodiment of the improved light beam indicating portion of the balancing machine.

Referring more particularly to Figs. 1 and 2 of the drawings, my improved mass centering machine comprises a stationary support or housing 11 for enclosing and supporting the elements of the apparatus. In accordance with usual practise, the housing has a pedestal flange 13 extending outwardly around the lower peripheral edge for securing the machine to the floor upon which it is mounted. The outer housing 11 may be made of cast metal of any suitable shape for compactly enclosing the elements of the machine and the upper wall is provided with two apertures 15 and 17 for mounting the work support and the viewing screen in convenient adjacent relation.

Rising from the aperture 17 is a cylindrical shell or collar 19 having an outwardly projecting flange 21 around its lower edge which is secured to the housing by bolts or screws 23 passing down therethrough. Seated upon the upper edge of the sleeve 19 is a generally conical shaped member 25 having a laterally projecting flange 27 around the upper edge for resting upon the upper edge of the sleeve, where it is secured as by screws 29 passing therethrough. An annular groove is provided in the inner edge of the upper side of the flange 27 on the cone for receiving and seating the peripheral edges of circular viewing screen 31, and a retaining ring 33 is secured thereon by the bolts which pass down therethrough for securing the cone on the cylindrical sleeve. The conical member is substantially funnel shaped having a light projecting tube 35 opening and extending down into the housing from the apex.

For projecting light into the lower end of the tube 35 a light projector is positioned thereunder where it may be permanently mounted as by a bracket 37 projecting in from the side wall of the enclosing housing. The light projector may consist of a housing 39 enclosing an incandescent electric lamp 41, of a type having a small or concentrated filament, and a tube 43 opening upwardly therefrom in alignment with the lower end of the tube 35 extending down from the conical member. The lamp housing tube is provided with suitable light refracting means or lenses 45 for projecting the light upwardly in substantially parallel rays to enter the lower end of the tube 35. Suitable lenses 47, 49 and 51 are mounted in the tube 35, in a manner usual in optical practice. These lenses 47, 49 and 51 are suitably selected and spaced in the tube 35 for receiving and transmitting the parallel light rays received from the light source and focussed for projecting a sharp index image upon the screen 31 at the upper end of the cone.

The screen 31 is made of any suitable light transmitting material, preferably translucent, and it has opaque gauging marks spaced apart thereon in such a manner that the movements of a light spot or shadow may be conveniently observed to determine the magnitude and the direction thereof. For this purpose the gauging marks on the screen preferably consist of a plurality of circular lines 53 of different diameters disposed concentrically in the manner in which targets are usually marked. On this arrangement, the magnitude of deflections originating at the center can be quickly and conveniently observed. To provide for observing precisely the direction of a deflection originating from the center, I provide also a plurality of straight line gauging marks 55 on the screen intersecting at the center and spreading radially therefrom in intersecting relation with the concentric lines. The light projected onto the screen is deflected or varied in accordance with the direction and the magnitude of the unbalanced mass of a piece of work being tested on my mass balancing machine in a manner to be subsequently described.

Mounted upon the edge of the other aperture 15 in the supporting housing I provide a stationary supporting ring 57, as shown in Fig. 2, which is secured thereon in any suitable manner, as by screws 59 passing through into the housing. Movably mounted therein I provide an intermediate support member which may be in the form of an annular ring 61. In order that the intermediate support ring 61 may be mounted for relative movement in a compact rugged assembly it is made of a substantially smaller diameter than the outer support ring 57 and it is assembled in concentric relation therein. For movably mounting the intermediate support ring 61, I provide a pair of lugs 63 which project outwardly from the ring in diametrically opposite directions. The diametrically opposed lugs 63 are preferably of a vertical thickness less than half of the vertical thickness of the intermediate support ring 61 and project from the lower portion of the ring. The stationary support ring 57 is also provided with a pair of lugs 65 projecting from the ring at diametrically opposite points and these project inwardly over the other lugs 63 which project outwardly from the intermediate support ring. By also making the inwardly projecting lugs 65 of a vertical thickness less than half the thickness of the ring from which they project and by extending these inwardly from the upper portion of the ring, the two rings 57 and 61 may be assembled together in a very compact assembly while providing a small space between to permit relative movement, as may be seen in Figs. 2 and 4.

As shown more clearly in Fig. 4, I provide extending vertically across the two adjacent lugs a thin ribbon 67 of steel, or other metal, having a suitable resilience to normally tend to hold the intermediate support ring 61 in a horizontal position while also having suitable flexibility to bend when an unbalanced load is placed thereon, to permit the ring to rotate accordingly, through a small angle, on an axis passing horizontally through the two ribbons. The upper and lower ends of the ribbon are secured firmly to the adjacent respective lugs 65 and 63 by plates 69 clamped thereon as by screws or bolts 71. For this purpose a steel ribbon approximately 5/1000 inch in thickness has proven satisfactory when the spacing of the lugs and the clamp plates are arranged to provide a bending length of the ribbon of about 5/1000 inch. While the above mentioned dimensions of thickness and spacing have proven very satisfactory for testing work pieces within a certain range of sizes and shapes, it is to be understood that the thickness of the supporting ribbon and the spacing of the rings may be varied and the machine may be made larger or smaller for testing lighter or heavier work pieces. In this arrangement the ribbon 67 is tensioned for supporting the intermediate ring which is suspended from the stationary support.

A work support 73 is provided which is preferably of a generally circular or disk like conformation and of a diameter such that it may be mounted in concentric relation within the intermediate support ring 61 and spaced slightly therefrom to permit free movement. To mount the work support 73, the intermediate ring 61 is provided with two notches or cut out portions 75 at diametrically opposed points in the under side and at right angles to the lugs projecting outwardly therefrom and previously described. One of the notches in the under side of the intermediate support ring may be seen in Fig. 2 over the top of and beyond the work support. The disk shaped work support 73 is provided with a pair of elongated lugs 77 which project outwardly therefrom in diametrically opposite positions, extending out through the notches 75 in the under side of the intermediate ring 61, and passing in spaced relation under lugs 79 which extend outwardly from the upper portion of the intermediate ring, as shown in Figs. 3 and 5. Two thin flexible ribbons 81 of metal pass vertically across the side of the adjacent upper and lower lugs 77 and 79 on opposite sides of the work support being clamped firmly to the lugs as by clamp plates 83 and bolts 85, in a manner similar to that previously described for the mounting of the intermediate ring on the stationary ring. The lugs 77 and 79 are so projected from the intermediate ring and the work support that these ribbons 81 are suspended on a line passing through the center of the work support 73 so that this member will be balanced on its supports when not unbalanced by a work piece to be tested.

As shown in Figs. 1 and 2, a work table 87 is provided for mounting work to be tested. The work table 87 is of a circular disk shape and is provided with a hub 89 extending downwardly from the center of the lower side. The hub 89 has a conical downwardly converging surface having a suitable angular inclination to seat freely and without sticking into a conical socket provided in a hub 91 in the center of the work support 73. In the center of the upper surface of the test table an aperture or socket 93 is provided for receiving any suitable centering adapter or fixture 95, shown in Fig. 2, which is selected and inserted therein in accordance with the nature of the piece of work 96 (shown in dotted lines) which is to be tested on the machine.

To lift the work table 87 from the resiliently suspended work support 73 while removing metal from the piece of work to be balanced or while moving work on or from the table, I provide a shaft 97, as shown in Fig. 2, which slides vertically through a pair of vertically spaced bearings 99 supported by bracket arms 101 projecting from the side walls of the housing 11. The vertical shaft is positioned in central alignment with the work support table, and the upper end is conically tapered for fitting into the conical socket 103 provided in and opening downwardly from the center of the hub of the work table 87. The taper of the conical surfaces is selected suitably to avoid sticking of the shaft in the work table when it is lowered. For raising and lowering the shaft 97 conveniently at the wish of the operator, a shaft 105 is provided which extends horizontally and is journalled in a bearing bracket 107 extended between the two sliding bearings 99 and passes outwardly through the sidewall of the housing 11 in which it may be rotatably journalled in any suitable manner, as will be readily understood. The inner end of the shaft 105 is provided with an eccentric or cam 109 which is operatively disposed in a slot 111 in the side of the vertical shaft 97. As the shaft 105 is rotated by a crank 113 secured on the outer end of the shaft, the cam or eccentric 109 is rotated and the shaft 97 is raised to lift the work table 87 from the flexibly suspended work support 73 while metal is being removed from or added to the piece of work to be balanced or while work is being installed on or removed from the testing machine.

When an unbalanced piece of work is placed on the mass balancing machine, the suspended work support 73 is caused to tilt on a horizontal axis passing through its suspending ribbons 81 and it rotates through a small angle corresponding to the amount of the unbalanced moment about this axis. But at the same time the intermediate support ring 61 is caused to rotate through a small angle on an axis of rotation disposed at right angles to the first mentioned axis of rotation and passing through the ribbons 67 which support the ring, and the angular deflection of the ring 61 corresponds to the unbalanced moment about this axis. To provide a measurement of the amount and position of the unbalanced mass of the work being tested indicating means is provided which produces a conveniently observable manifestation which varies in accordance with the above described deflections of the suspended work support and the intermediate ring. For this purpose, an opaque index marker 113 is provided, which may be a dot of opaque paint on a glass plate 115 although various and reversed arrangements may also be utilized. The glass plate 115 is mounted adjustably by spring clips 116 on a substantially horizontal strip 117 having an aperture 119 in alignment with the lower end of the optical tube 35 so that the light may normally pass therethrough onto the viewing screen 31 projecting a shadow of the index dot 113 on the center of the screen.

For moving the index dot 113 in accordance with the direction and amount of the unbalanced mass of the work piece to be indicated, one end of the strip 117 is secured to the lower end of an arm 121 extending rigidly down from the movable work support 73, to which it may be secured as by a screw 123. The lower end of the arm 121 is preferably bent parallel to the plane of the work support and extended laterally to a position in alignment with the center or axis of the work support disk. The end of the arm is secured to the adjacent end of the index support strip 117 by means of a flexible ribbon 125 secured between clamping plates 127 clamped together by screws 129. The side of the intermediate support ring 61 adjacent the viewing screen is provided with a downwardly projecting bracket 131, which may be secured thereto by a screw or welding in any suitable manner. The ends of two arms 133 are clamped to opposite sides of the bracket 131, as by a bolt 135 passing therethrough, and for firmly supporting the arms suitable notches may be provided on opposite sides of the bracket if desired. The two arms 133 pass around the viewing cone 25 toward the corners of the housing and are joined together through a yoke 137 passing therebetween. Suspended from the extended ends of the arms 133 adjacent the corners of the housing is a light weight triangular piece 139, the corners of which are secured thereto through flexible suspension ribbons 140 secured at one end by bolts 141 passing through clamp plates 143 into the ends of the arms. The other end of each ribbon is clamped between clamp plates 142 and secured to the corner of the triangle by bolts 144. The lower end or apex of the suspension triangle 139 converges toward the center line of the housing and is secured together by a bolt 145 which passes through two clamp plates 147 thus clamping the one end of a flexible ribbon 149 the other end of which is similarly secured to the adjacent end of the horizontal strip 117.

In this arrangement the deflections of the flexible suspended intermediate ring 61 and the flexibly suspended work support 73 are cooperatively coordinated and applied to move the index marker 113 to produce a proper manifestation on the screen in the manner previously described. The machine may be calibrated to indicate the amount of unbalance in inch ounces or any other units desired by the suitable selection of the distance of the center of gravity of the elements making up the swinging structure from the horizontal ribbon plane. To facilitate balancing the work piece, marks 53' and 55' are provided on the work table corresponding to the marks on the screen 31, and which may be observed between the spokes of a fly wheel or a tire supporting wheel, or around the peripheral edges of small work pieces, and the like. Calibration may also be accomplished in any customary manner of calibrating instruments, as by applying the marks on the screen in properly spaced positions, as will be understood. Differently calibrated screens are easily interchanged by removing the ring 33 shown in Fig. 2.

In Fig. 6, a simplified embodiment of the indicator operator means is diagrammatically represented. In accordance with this embodiment of my invention, the opaque index pointer 113 is carried directly on the arm 121 which projects rigidly down from the suspended work support 73. This is conveniently accomplished by providing clamping slot 151 in the end of the arm and inserting the transparent plate 115 therein which carries the index dot. The plate may be secured in the arm by a bolt 153 passing through and clamping together the bifurcated end of the arm. In this embodiment the light source 39 is mounted above the index dot 113 and the light is projected downwardly therearound. Disposed under the index marker is a reflector or refractor 155 and an optical system comprising lenses 157 and 159 and a second reflector or refractor 161 suitably spaced and enclosed as by interconnected tubes 163, 165 and 167 for accurately transmitting the light variations from the measuring index and projecting upon the graduated screen 31 to produce visual manifestations of the measurements conveniently disposed, as in the first embodiment previously described. In this arrangement a simplified construction is provided with a minimum of moving parts. As in the first embodiment, the screen 31 is provided with suitably arranged and spaced marks for indicating both the direction of the position and the amount of the unbalanced mass in the work piece being tested on the machine. This arrangement may also be calibrated to produce the measuring indications in any desired units such as ounce inches or other suitable units. A counterweight 168 is also secured to work support 73 to compensate for the weight of the arm 121. If desired elongated flexible suspension members other than ribbons may be utilized. The bending points of the flexible suspension members are disposed in a horizontal plane with the center of gravity of the swinging structure lower than this plane for normally assuming a horizontal position of equilibrium.

It is apparent that within the scope of the invention, modifications and different arrangements may be made other than herein disclosed, and the present disclosure is illustrative merely, the invention comprehending variations thereof.

I claim:

1. A static work balancer having in combination, a work support arranged to receive work to be centered thereon for balancing, a housing, mounting means in the upper wall of said housing for mounting the work support for universal tilting movement and tending to maintain the work support in a predetermined normal position, a light receiving screen disposed in the upper wall of the housing adjacent the work support, said screen having thereon gauging marks suitably disposed for showing the direction and magnitude of the deflections caused by the unbalanced condition of a piece of work on the tiltable work support, an arm extending from the movable work support and having an opaque index marker projecting laterally therefrom, a light source for projecting a beam of light downwardly around said opaque index marker, and an optical system arranged for transmitting the downwardly projected light beam upwardly to the screen for providing a conveniently disposed magnified manifestation on the screen adjacent the work support for measuring the unbalanced condition of the work piece being tested.

2. In combination in a static balancing machine, a stationary support, an intermediate support ring having four supporting lugs projecting substantially radially at right angles forming two diametrically opposed pairs, a pair of supporting lugs projecting from said stationary support and spaced horizontally at a suitable distance to extend over two of the diametrically opposed lugs extending from the intermediate ring, a flexible ribbon secured to each stationary supporting lug, each flexible ribbon extending down from the attached stationary lug to the adjacent lug projecting thereunder from the intermediate ring for tensionally supporting the intermediate ring, a work support of a generally circular shape and of a suitable diameter relative to the ring to be supported in a substantially concentric position in the opening in the ring but sufficiently spaced therefrom for free relative movement, a pair of support lugs projecting in diametrically opposite directions from said work support and extending in spaced relation under the other or free pair of diametrically opposed lugs projecting from the intermediate support ring, a flexible ribbon extending and secured between each work support lug and the adjacent overlapping lug from the intermediate ring, a stationarily mounted gauging element, movable indicator means connected to said movable work support and extending therefrom for producing measuring manifestations adjacent said gauging element in accordance with the direction and degree of movement of the work support when an unbalanced piece of work is supported thereon.

3. A static balancing machine comprising, a stationary support, a work support adapted to receive work centered thereon for balancing, an intermediate support member, means mounting the intermediate support member on said stationary support for angular movement on a substantially horizontal axis, means mounting the work support on the intermediate member for angular movement on an axis substantially horizontal and at right angles to the axis of movement of said intermediate member, a marked light receiving screen, means for projecting light on the marked screen, a movable indicator index disposed in the light path to produce visual indications, and actuator means connecting from both the intermediate support member and the work support to said index for moving the index for producing indications of the amount and position of the unbalanced mass in a piece of work being tested on the machine.

4. In combination in a static mass balancing machine, a stationary support, an intermediate support ring having four support lugs projecting substantially radially at right angles forming two diametrically opposed pairs, a pair of supporting lugs projecting from said stationary support and spaced horizontally at a suitable distance to extend over two of the diametrically opposed lugs extending from the intermediate ring, a ribbon secured to each stationary supporting lug, each ribbon extending down from the attached stationary lug to the adjacent lug projecting thereunder from the intermediate ring for tensionally suspending the intermediate ring for angular rotation on a substantially horizontal axis, a work support of a generally circular shape and of a suitable diameter relative to the ring to be supported in a substantially concentric position in the opening in the ring but sufficiently spaced therefrom for free relative movement, a pair of support lugs projecting in diametrically opposite directions from said work support and extending in spaced relation under the other or free pair of diametrically opposed lugs projecting from the intermediate support ring, a ribbon secured to each lug extending from the work support and secured to each adjacent lug of the intermediate ring for tensionally supporting the work support for angular movement on a horizontal axis substantially at right angles to the axis of movement of the intermediate ring, a stationary marked gauging element, a movable indicator cooperative with said gauging element for producing visual indications, actuating means extending from said intermediate ring to said indicator, and actuating means extending from the work support to said indicator.

5. A static balancing machine comprising, a stationary support, a work support adapted to receive work centered thereon for balancing, an intermediate support member, means mounting the intermediate support member on said stationary support for angular movement on a substantially horizontal axis, means mounting the work support on the intermediate member for angular movement on an axis substantially horizontal and at right angles to the axis of movement of said intermediate member, a screen of light transmitting material, said screen having thereon a plurality of spaced marks, a light source spaced from the screen for projecting light thereon, a movable index extending to a point in the path of the light traverse between the screen and the light source for producing magnified measuring manifestations on said screen in accordance with the amount and position of the unbalanced mass in a piece of work to be tested, and actuating elements extending to said index from the intermediate support and also from the work support so that the index is operated in accordance with a combined influence from both movable supports.

6. A static balancing machine comprising, a stationary support, a work support, an intermediate support member, means mounting the intermediate support member on said stationary support for angular movement on a substantially horizontal axis, means mounting the work support on the intermediate member for angular movement on an axis substantially horizontal and at right angles to the axis of movement of said intermediate member, indicator means responsive to movements of said work support, a work table adapted to receive and center work for balancing, a hub projecting down from the lower side of said table, said hub being of a downwardly converging conformation, a socket opening through the center of said work support and of a suitable conformation for receiving and centering the hub of said work table therein, and elevating means actuable for lifting said work table from the movable work support when work is to be changed on the table.

7. A static balancing machine comprising, a stationary support, a work support, an intermediate support member, means mounting the intermediate support member on said stationary support for angular movement on a substantially horizontal axis, means mounting the work support on the intermediate member for angular movement on an axis substantially horizontal and at right angles to the axis of movement of said intermediate member, indicator means responsive to movements of said work support, a work table adapted to receive and center work for balancing, a hub projecting down from the lower side of said table and having a socket opening in the lower end thereof, said hub having an outward shape which is downwardly converging, a socket opening through the center of said work support and of a suitable conformation for receiving and centering the hub of said work table therein, an elevating shaft, bearing means for slidably guiding said shaft in a vertical position in alignment with the center of the work support and table, and means for raising said shaft to insert the upper end into the socket in the hub and lift the work table from the movable work support member when work is to be changed on said table.

8. A static balancing machine comprising, a work support adapted to receive a work piece centered thereon for balancing, means mounting said work support movably to assume a substantially central and stationary position when unloaded or when supporting a balanced load, and universally tiltable to assume a different position in accordance with the unbalanced mass when supporting an unbalanced work piece, a stationary light receiving screen, means for projecting light on said screen, and means extending from the universally tiltable work support into the path of the light for modifying the light on the screen to provide an amplified indication of the position assumed by the movable work support in accordance with the unbalanced mass in a piece to be tested.

9. In combination in a static balancing apparatus, a work support arranged to receive work to be centered thereon for balancing, a base having an upper wall, mounting means in the upper wall of said base for mounting the work support for universal tilting movement and tending to maintain the work support in a predetermined normal position, a light receiving screen disposed in the upper wall of the base adjacent the work support, said screen having thereon gauging marks suitably disposed for showing the direction and magnitude of the deflections caused by the unbalanced condition of a piece of work on the tiltable work support, an arm extending from the movable work support and having an index marker projecting laterally therefrom, a light source for projecting a beam of light past said index marker, and an optical system arranged for transmitting the projected light beam on the screen for providing a conveniently disposed magnified manifestation on the screen adjacent the work support for measuring the unbalanced condition of the work piece being tested.

LOUIS PETERSEN.